Patented Oct. 8, 1935

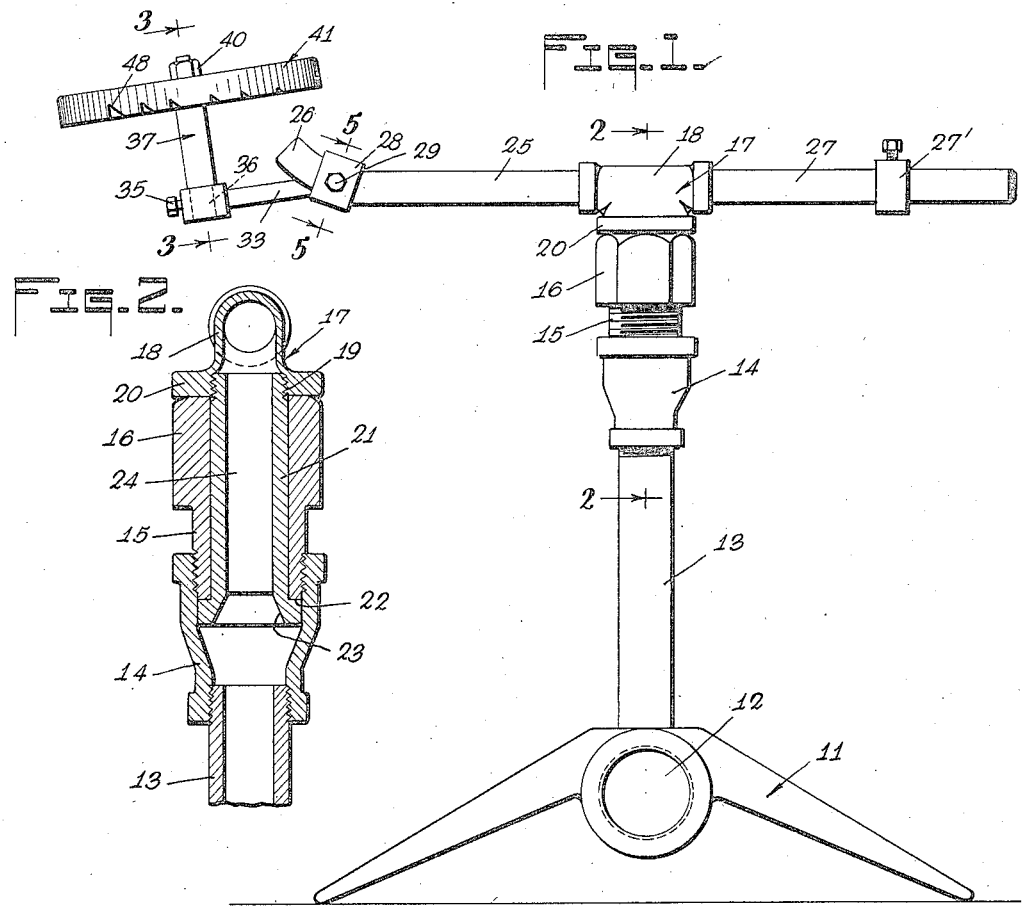

2,016,743

UNITED STATES PATENT OFFICE 2,016,743

SPRINKLER

Jean Ghislain, Downey, Calif.

Application February 7, 1934, Serial No. 710,075

11 Claims. (Cl. 299—69)

My invention relates to a rotary type of water sprinkler for lawn watering, or the like.

An object and feature of my invention is the employment of a water jet discharged from a rotary sprinkler head impinging on a rotary interceptor and water spreader. This interceptor is in the form of a disc and by the impulse of the water jet, is caused to rotate at a relatively high speed. This water spreader is preferably provided with ribs which may extend somewhat radially but preferably in a curve in the form of vanes or blades for driving the spreader and these vanes or blades cause the water to be thrown outwardly by centrifugal action.

Another feature of my invention comprises providing the spreader with a rim more or less confining the water at the ends of the vanes and this rim is provided with a plurality of openings or notches of different sizes to allow a relatively free and more restricted discharge of water radially at the rim, thus giving a variable spread to the circular spray developed by the spreader.

Another detailed feature of my invention relates to the variable adjustability of the spreader relative to the rotor head having the discharge jet.

A further feature of my invention is varying the speed of the rotor head and the discharge jet or nozzle by changing the inclination of the rotary disc spreader. This causes a variable reaction of the water spray in the air and thus may be used to vary the speed of rotation of the rotary head and the sprayer as a whole.

My invention is illustrated in connection with the accompanying drawing in which:

Fig. 1 is an elevation.

Fig. 2 is a detailed vertical section on the line 2—2 of Fig. 1 through the rotary head. Fig. 3 is a detailed vertical section on the line 3—3 of Fig. 1 in the direction of the arrows through the sprayer.

Fig. 4 is a detailed section on the line 4—4 of Fig. 3 in the direction of the arrows showing the sprayer disc.

Fig. 5 is a detailed section on the line 5—5 of Fig. 1 in the direction of the arrows showing the adjustable mounting of the sprayer disc on the rotary nozzle structure.

In my invention, I employ a suitable stand 11 having an inlet 12 for the supply water. This inlet connects to a vertical stand pipe 13 which has a coupling 14 connected thereto. Threaded in this coupling there is a nipple 15 having a wrench head 16. The rotary head 17 is illustrated as being constructed in the form of a T 18 having internal threads 19 on an integral ring 20. A rotary sleeve 21 is rotatably mounted inside of the nipple and the head 16, and engages the threads 19. This sleeve has an outwardly extending shoulder 22 at the lower end engaging the lower end of the nipple 15, and being located in the coupling 14. This sleeve has a flared bore 23 at the bottom and a cylindrical bore 24 thereabove and discharges into the rotary head 17. Connected to the T 18 of the rotary head there is a nozzle pipe 25 having a slightly upwardly curved discharge nozzle 26. The counter-weight arm 27 with adjustable counter-weight 27' is used to balance the pipe 25 and the rotary sprayer mounted on the nozzle pipe. This mounting comprises a collar 28 secured by a set screw 29 to the nozzle pipe, a threaded stud 30 extends laterally from this collar and has a wing nut 31 threaded thereon. This is used to jam or clamp the hub end 32 of an arm 33 and thus determine the angularity of this arm in reference to the nozzle pipe 25.

The arm 33 has a socket 34 at its outer end with a set screw 35 which set screw engages the lower contracted end 36 of a spindle 37. This spindle has a contracted cylindrical end 38 at the top with a bushing 39 thereon, and a nut 40.

Rotatably mounted on the bushing is the rotary spreader 41. This is in the form of a disc 42 having a series of arcuate vanes or blades 43. These may be considered as ribs. They are slightly spaced on their inner ends by a space 44 from the hub 45 of the disc and there is also a space 46 between the ends of the vanes and a downwardly turned rim 47 on the disc. This rim is provided with a few notches 48 which notches vary in size. (Note Fig. 1.)

In the operation of my invention, obviously by having the collar 28 adjustable longitudinally and in a rotary manner in relation to the pipe 25 and discharge nozzle 26, the spreader disc 41 may be altered longitudinally of the nozzle 26 and also to one side or the other of this, or above the nozzle so long as the water impinges on the disc. The arm 33 may also be adjusted on the threaded stud 30, thus regulating the angle on which the water jet nozzle 26 strikes the under side of the disc. The impingement of the water on the curved vanes 43 causes a rapid rotation of the disc. Some of the water is caught by the rim 47 and is deflected more or less downwardly, the rim restricting the spread of the circular spray. Water which is ejected through notches 48 is projected at a greater distance and as these notches are graduated in size, the water spread outwardly by centrifugal force through the large notches is thrown to a greater distance than that thrown through the small notches. Moreover, the manner in which the water impinges on the disc 41 and the reaction of the water discharged from the disc on the air causes a rotation of the rotary head 17 on the stand pipe 13. Thus, the spreader is carried bodily in a circle while it rotates thereby giving a combined action of two rotary sprayers.

Various changes may be made in the details of construction of my invention without departing from the spirit or scope of the appended claims.

I claim:

1. A sprinkler having a water pipe with a nozzle, an arm adjustably mounted on the pipe, a disc rotatably mounted on the arm to receive the water discharged from the nozzle on one face of the disc, and means reacting to the water jet from the nozzle to rotate the said disc, the said reacting means comprising curved vanes on the under side of the disc, a downturned rim on the same side as the vanes, said rim having a plurality of notches varied in size.

2. A sprinkler as claimed in claim 1, the said pipe being mounted on a rotary head having means for the flow of water, the said head and disc being adapted to rotate as a unit.

3. A sprinkler comprising in combination, a rotary head, a pipe having a connection through the head to a water supply, a nozzle on the end of the pipe at an angle to the axis of the pipe, an arm adjustably mounted on the pipe, a shaft distinct from the arm but secured to the arm, a disc rotatably mounted on the shaft and having a plurality of vanes on one surface positioned to receive the jet of water discharged from the nozzle, the said vanes being curved and extending outwardly from the inner towards the outer portion of the disc, the disc having a downturned rim on the same side as the vanes, the said rim having a plurality of notches.

4. A sprinkler comprising in combination, a rotary nozzle pipe having a discharge nozzle, a collar rotatably adjustable on said pipe as to the axis of the pipe, an arm connected to the collar and a rotatably mounted disk supported by the arm and positioned to receive the impact of water discharging from the nozzle, the arm being adjustable to swing in a plane at right angles to a diameter of the collar.

5. A sprinkler comprising in combination, a rotary head, a nozzle pipe having a connection through the head to a water supply, a nozzle on the end of the pipe upturned at an angle to the axis of the pipe, a collar rotatably and longitudinally adjustable on the nozzle pipe, an arm pivoted to the collar to swing in a plane at right angles to a diameter of the collar, a spindle mounted on the outer end of the arm, a rotatable disc on the spindle and having a series of curved vanes to receive the impact of water from the nozzle, such impact rotating the disk.

6. A sprinkler as claimed in claim 5, the disk having a rim on the same surface having the vanes and the vanes terminating radially inwardly from the rim.

7. A sprinkler as claimed in claim 5, the disk having a rim on the same surface having the vanes and the vanes terminating radially inwardly from the rim, said rim having a series of notches varying in size.

8. In a sprinkler, a rotatable disk having a central hub, a spindle extending through the hub, a plurality of curved vanes, the vanes at their inner ends terminating away from the hub leaving an annular space between the inner ends of the vanes and the hub, a peripheral rim on the disk on the same side as the vanes, said rim having a plurality of notches of varying size.

9. In a sprinkler as claimed in claim 8, the outer ends of the vanes terminating inwardly of the said rim leaving an annular space inside the rim between the rim and the ends of the vanes and said rim having a plurality of notches of varying sizes.

10. A sprinkler having a water pipe with a discharge nozzle, a disc rotatably mounted and adjustable as to the said nozzle to receive discharged water from the nozzle at different angles of the disc, the said disc being rotated by the impulse of water, the said disc having a series of vanes on one side extending outwardly from the center to receive the water discharged from the nozzle and to cause a spreading of water from the disc by centrifugal action, wherein said disk is provided with a rim on the same side as the vanes, said rim having a plurality of notches.

11. In a sprinkler, a disk having a series of curved vanes extending from a position adjacent its center to a position adjacent its periphery, said disk adapted to be rotated on its axis and being adapted to be positioned to receive a jet of water striking the vanes, the disk having a peripheral rim on the same side as the vanes, the outer ends of the vanes terminating inwardly from the rim, said rim having a plurality of notches of varying size.

JEAN GHISLAIN.